US010384650B2

(12) United States Patent
Okabe et al.

(10) Patent No.: US 10,384,650 B2
(45) Date of Patent: Aug. 20, 2019

(54) VEHICULAR WIPER DEVICE

(71) Applicant: HONDA MOTOR CO., LTD., Tokyo (JP)

(72) Inventors: Koji Okabe, Wako (JP); Takashi Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 14/819,647

(22) Filed: Aug. 6, 2015

(65) Prior Publication Data

US 2016/0039391 A1 Feb. 11, 2016

(30) Foreign Application Priority Data

Aug. 8, 2014 (JP) ................................ 2014-163050

(51) Int. Cl.

| | |
|---|---|
| ***B60S 1/08*** | (2006.01) |
| ***B60S 1/04*** | (2006.01) |
| ***B60S 1/24*** | (2006.01) |
| *B60S 1/34* | (2006.01) |
| *B60S 1/16* | (2006.01) |

(52) U.S. Cl.

CPC ........... *B60S 1/0818* (2013.01); *B60S 1/0463* (2013.01); *B60S 1/245* (2013.01); *B60S 1/0452* (2013.01); *B60S 1/08* (2013.01); *B60S 1/0822* (2013.01); *B60S 1/0862* (2013.01); *B60S 1/0896* (2013.01); *B60S 1/163* (2013.01); *B60S 1/3418* (2013.01)

(58) Field of Classification Search

CPC .... B60S 1/0818; B60S 1/0822; B60S 1/0896; B60S 1/0862; B60S 1/0463; B60S 1/245; B60S 1/0452; B60S 1/3418; B60S 1/08; B60S 1/163

USPC ............... 15/250.12, 250.16, 250.17, 250.13

See application file for complete search history.

(56) References Cited

U.S. PATENT DOCUMENTS

| | | | | |
|---|---|---|---|---|
| 6,249,098 B1 * | 6/2001 | Miyazaki | .................. | B60S 1/08 15/250.12 |
| 7,895,701 B2 | 3/2011 | Amagasa et al. | | |

FOREIGN PATENT DOCUMENTS

| | | | | |
|---|---|---|---|---|
| CA | 2435602 A1 * | 2/2004 | .............. | B60S 1/026 |
| DE | 102012206767 A1 * | 10/2013 | ................ | B60J 1/02 |
| EP | 1042146 B1 * | 2/2007 | ................ | B60S 1/08 |
| JP | 2-14528 Y2 | 4/1990 | | |
| JP | 4425306 B2 | 3/2010 | | |

* cited by examiner

*Primary Examiner* — Monica S Carter
*Assistant Examiner* — Katina N. Henson
(74) *Attorney, Agent, or Firm* — Westerman, Hattori, Daniels & Adrian, LLP

(57) ABSTRACT

A vehicular wiper device is provided with a snowfall determination unit that determines whether a predetermined snowfall condition is satisfied. When the snowfall determination unit determines that a predetermined snowfall condition is satisfied, a controller that controls a wiper motor changes lower reverse positions of wiper blades to lower reverse positions during snowfall that are on the lower side with respect to lower reverse positions during normal times.

9 Claims, 5 Drawing Sheets

VEHICULAR WIPER DEVICE

CROSS REFERENCES TO RELATED APPLICATIONS

The present application claims priority under 35 U.S.C. § 119 to Japanese Patent Application No. 2014-163050, filed Aug. 8, 2014, entitled "Vehicular Wiper Device." The contents of this application are incorporated herein by reference in their entirety.

BACKGROUND

1. Field

The present disclosure relates to a vehicular wiper device that wipes a windshield panel of a vehicle.

2. Description of the Related Art

In a wiper device used in a vehicle, wiper blades that wipe a surface of a windshield panel are held by wiper arms, and base portions of the wiper arms are held by pivotal pivot shafts. Furthermore, the pivot shafts are connected to output shafts of wiper motors through link mechanisms, such as lever crank mechanisms, so as to be capable of transmitting power (see Japanese Patent No. 4425306, Japanese Examined Utility Model Registration Application Publication No. 2-14528, for example).

In the wiper device described in Japanese Patent No. 4425306, the wiper motors are each controlled so as to repeat a normal rotation and a reverse rotation, and the normal and reverse rotation of the output shafts of the wiper motors are transmitted to the pivot shafts through the link mechanisms. With the above, in accordance with the normal and reverse rotation of the pivot shafts, the wiper blades reciprocate between lower reverse positions and upper reverse positions while wiping water drops and dirt on the surface of the windshield panel. Furthermore, in the above wiper device, the wiper blades are capable of moving to rest positions below the lower reverse positions so that the wiper blades can be rested at the lower edge in the front of the windshield panel when not in use.

Furthermore, in the wiper device described in Japanese Examined Utility Model Registration Application Publication No. 2-14528, when during normal use, the wiper motors are each controlled so as to rotate in one direction, and the rotation of each wiper motor in one direction is converted into a left and right pivoting motion at a predetermined range of angle of the pivot shaft through the lever crank mechanisms. However, in the above wiper device, during snowfall, when the snow is pressed and hardened at portions around the lower reverse positions of the wiper blades, there is a possibility that the lever crank mechanisms cannot be continuously operated; accordingly, when loads acting on the wiper motors through the wiper blades become equivalent to or larger than a prescribed value, the rotation direction of each of the wiper motors is reversed.

SUMMARY

However, in both of the wiper devices described in Japanese Patent No. 4425306 and Japanese Examined Utility Model Registration Application Publication No. 2-14528, during snowfall, when snow adhered to the surface of the windshield panel is shoved away to the lower edge of the windshield panel and when snow that has been pressed and hardened by the wiper blades accumulates over the lower reverse position, the wiping ranges of the wiper blades become gradually narrow. Furthermore, in order to avoid the wiping ranges of the wiper blades from becoming narrow early during snowfall, one may conceive of setting the lower reverse positions of the wiper blades at further lower positions; however when the lower reverse positions are set at unnecessarily low positions, during normal use such as during rainfall, the wiping efficiencies of the wiper blades in essential portions are lowered.

Furthermore, in the case of the wiper device described in Japanese Patent No. 4425306 in particular, because the wiper blades are configured so as to be capable of being moved to the rest positions below the lower reverse positions, the torque amplification effect of the link mechanisms becomes the largest when the wiper blades are positioned around the rest positions. Accordingly, a large torque amplification effect cannot be obtained when the wiper blades are positioned around the lower reverse positions. Accordingly, in the case of the wiper device described in Japanese Patent No. 4425306, the wiping ranges of the wiper blades may become narrowed relatively early during snowfall.

Therefore, the present disclosure provides a vehicular wiper device that is capable of avoiding the wiping ranges of the wiper blades from becoming narrow early during snowfall while avoiding the wiping efficiencies of the wiper blades from becoming lowered during normal use other than during snowfalls.

The present application describes a vehicular wiper device including a wiper blade (wiper blades 12L and 12R of an exemplary embodiment, for example) that wipes a windshield panel (a windshield panel 2 of the exemplary embodiment, for example) of a vehicle; a wiper motor (a wiper motor 14 of the exemplary embodiment, for example) that drives the wiper blade, the wiper motor being capable of normal and reverse rotation; and a controller that controls the wiper motor. With the control of the wiper motor with the controller, the wiper blade reciprocates between a lower reverse position (a lower reverse position LP of the exemplary embodiment, for example) and an upper reverse position (an upper reverse position UP of the exemplary embodiment, for example) and the wiper blade moves to a rest position (a rest position SP of the exemplary embodiment, for example) that is on a lower side with respect to the lower reverse position. The vehicular wiper device is provided with a snowfall determination unit that determines whether a predetermined snowfall condition is satisfied. The controller changes the lower reverse position of the wiper blade set as a default or initial lower position for the reciprocating motion (a first lower reverse position) to a further lower reverse position during snowfall (i.e., a second lower reverse position such as SLP1 and SLP2 during snowfall of the exemplary embodiment, for example) that is below the first lower reverse position during normal time.

With the above, during snowfall, when the snowfall determination unit determines that the snowfall condition is satisfied, the first lower reverse position of the wiper blade is changed to the second lower reverse position during snowfall; accordingly, snow accumulated at the lower edge of the windshield panel is pressed and hardened at the second lower position at an early stage. Accordingly, time taken for the field of view of the front side of the windshield panel to be narrowed is increased, whereby clear and wide views through the windshield are secured for a longer time of period despite the snow accumulation overtime.

The lower reverse position during snowfall is preferably set above the rest position.

In such a case, during snowfall, when the lower reverse position of the wiper blade is changed to the lower reverse position during snowfall, even if the wiper blade overruns the reverse position during snowfall, the wiper blade can be prevented, beforehand, from interfering with the other members of the storage unit.

As the moving speed of the wiper blade becomes higher, the lower reverse position during snow may be preferably further changed, i.e., adjusted so as to be positioned more on an upper side.

In the above case, as the moving speed of the wiper blade becomes higher and as the probability of the amount of overrun becoming large increases, the lower reverse position during snowfall is changed to the upper side. Accordingly, during high-speed wiping with the wiper blade, even if the wiper blade overruns the reverse position during snowfall, the wiper blade can be prevented from interfering with the other members of the storage unit in a further reliable manner.

The windshield panel may be provided with an opaque portion (an opaque portion 20 of the exemplary embodiment, for example) at a lower edge area, and the lower reverse position during snowfall may be positioned within a range of the opaque portion.

The opaque portion of the windshield panel functions so as to hide a parts attachment portion and the like on the inner side of the lower edge of the windshield panel, and the above opaque portion is an area outside the field of view of the occupant. Accordingly, during normal use of the wiper device other than during snowfall, there is no need to move the wiper blade to the opaque portion. In the case of the above configuration, by setting the reverse position during snowfall in the range of the opaque portion, the area that is a dead space can be effectively used as an extended margin of the lower reverse position of the wiper blade during snowfall.

The wiper blade may be supported by a wiper arm (wiper arms 10L and 10R of the exemplary embodiment, for example) that is joined to a pivotal pivot shaft as a pivot axis (pivot shafts 11L and 11R of the exemplary embodiment, for example), and an output lever as a second arm (an output lever 16 of the exemplary embodiment, for example) may be joined to an output shaft as an output axis (an output shaft 14*a* of the exemplary embodiment, for example) of the wiper motor, a shaft operation lever as a first arm (shaft operation levers 17L and 17R of the exemplary embodiment, for example) may be joined to the pivot shaft, a connecting link as a third arm (a connecting link 19 of the exemplary embodiment, for example) that interlocks the output lever and the shaft operation lever to each other may be connected to the output lever and the shaft operation lever in a pivotal manner, and when the wiper blade is in the rest position, the outer lever (the second arm) and the connecting link (the third arm) may be configured so as to be arranged in a substantially straight line in one direction.

In the above case, when the output lever and the connecting link are arranged in a substantially straight line, the torque of the wiper motor is amplified to its maximum with the link mechanism. Accordingly, the torque of the wiper motor is amplified to its maximum when the wiper blade is at the rest position and when the wiper blade is positioned at the lower reverse position during snowfall that is near the rest position, the amplification effect on the torque of the wiper motor is large as well. Accordingly, by employing the above structure, snow can be powerfully shoved away at the lower reverse position during snowfall.

During normal use other than during snowfall, decrease in wiping efficiency of the wiper blade caused by the wiper blade moving to an unnecessary area can be avoided, and during snowfall, the wiping range of the wiper blade becoming narrow early due to snow that has been pressed and hardened at the lower edge of the windshield panel can be avoided.

DESCRIPTION OF THE PREFERRED EMBODIMENTS

Hereinafter, an exemplary embodiment of the disclosure will be described with reference to the drawings.

Figure 1:
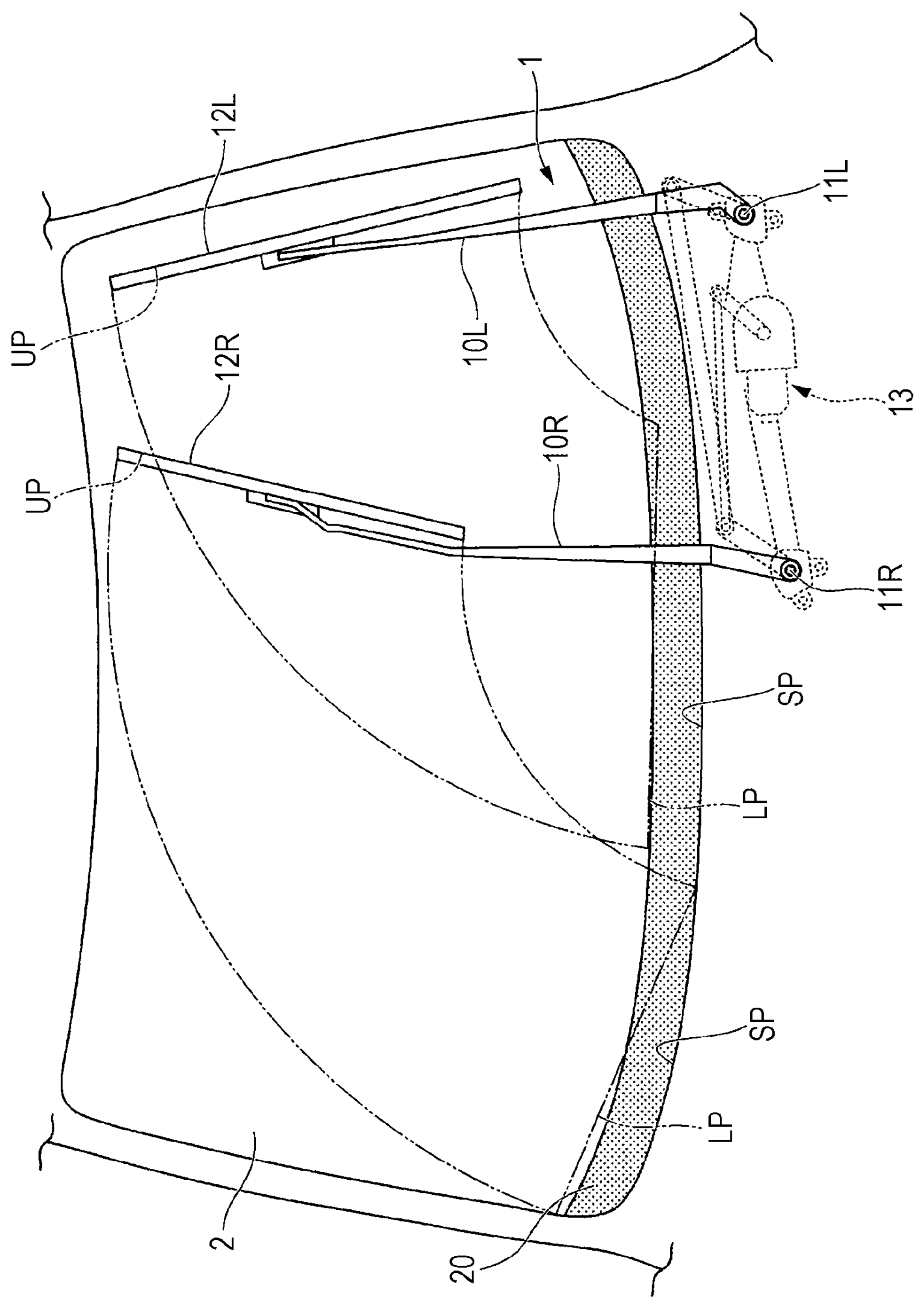
FIG. 1 is a front view of a windshield panel of a vehicle employing a wiper device of an exemplary embodiment of the present disclosure.

FIG. 1 is a front view of a windshield panel 2 (windshield) in front of a front seat of a vehicle that has employed a wiper device 1 according to the exemplary embodiment.

Left and right wiper arms 10L and 10R of the wiper device 1 that are spaced apart in the left and right direction are disposed at the lower edge of the windshield panel 2. Base portions of the wiper arms 10L and 10R are supported in a fixed manner by pivotal pivot shafts 11L and 11R, respectively. Wiper blades 12L and 12R for wiping the surface of the windshield panel 2 are attached to the distal ends of the wiper arms 10L and 10R, respectively. The pivot shafts 11L and 11R are provided in a wiper drive unit 13 that is installed so as to be fixed to a vehicle body member below the windshield panel 2.

Figure 2:
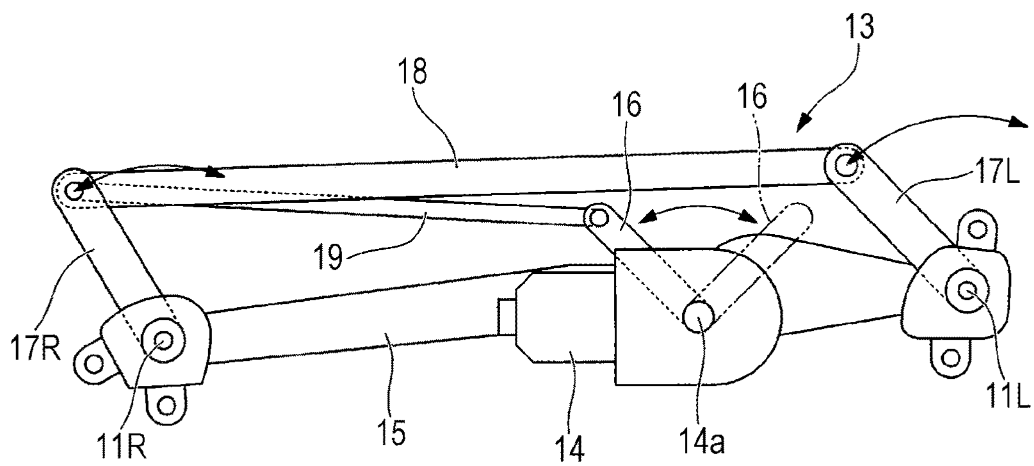
FIG. 2 is a front view of a wiper drive unit of the wiper device of the exemplary embodiment of the present disclosure.

FIG. 2 is a diagram illustrating details of the wiper drive unit 13.

The wiper drive unit 13 includes a wiper motor 14 capable of normal and reverse rotation, a unit frame 15 that holds the left and right pivot shafts 11L and 11R and the wiper motor 14, an output lever 16, the base end of which is joined to an output shaft 14*a* of the wiper motor 14, shaft operation levers 17L and 17R, the base ends of which are respectively joined to the left and right pivot shafts 11L and 11R, an interlocking link 18 that connects the distal ends of the left and right shaft operation levers 17L and 17R to each other so as to allow pivoting in a synchronized manner, and a connecting link 19 that is connected to the distal end of the output lever 16 and the distal end of the shaft operation lever 17R in a pivotal manner and that interlocks the output lever 16 and the shaft operation lever 17R to each other.

The unit frame 15 is installed and fixed to the vehicle body member so that the left and right pivot shafts 11L and 11R are positioned at specified positions of the vehicle. The pivotal driving force of the wiper motor 14 is transmitted to the right shaft operation lever 17R from the output shaft 14*a* through the output lever 16 and the connecting link 19, and the right pivot shaft 11R is pivotally driven with the right shaft operation lever 17R. Furthermore, the pivotal driving force of the wiper motor 14 that has been transmitted to the right shaft operation lever 17R is transmitted to the left shaft operation lever 17L through the interlocking link 18, and the left pivot shaft 11L is pivotally driven with the left shaft operation lever 17L.

Accordingly, in the wiper drive unit 13 of the present exemplary embodiment, the left and right wiper blades 12L and 12R (wiper arms 10L and 10R) can be pivotally driven with a common wiper motor 14. Note that although a configuration in which the left and right wiper blades 12L and 12R (wiper arms 10L and 10R) are pivotally driven by a common wiper motor 14 is employed in the present exemplary embodiment, the left and right wiper blades 12L and 12R (wiper arms 10L and 10R) may each be driven with a wiper motor and a link mechanism that are dedicated thereto.

The drive of the wiper motor 14 of the wiper drive unit 13 is controlled by a controller (not shown). When controlling the drive of the wiper motor 14 during normal operation of the wipers (during operation of the wipers other than during snowfalls), the controller controls the energization of the wiper motor 14 such that the left and right wiper blades 12L and 12R reciprocate between lower reverse positions LP, which are reference positions, and upper reverse positions UP and such that, when the operation of the wipers is ended, the wiper blades 12L and 12R move to rest positions SP below the lower reverse positions LP.

Note that reference numeral 20 in FIG. 1 is an opaque portion, such as a coating layer of black ceramic pigment, that is provided across the lower edge area of the windshield panel 2 in the width direction of the vehicle and that is provided so as to cover and hide a vehicle body adhesion portion and a parts attachment portion on the lower edge of the windshield panel 2 from the outside. In the case of the present exemplary embodiment, the rest positions SP of the wiper blades 12L and 12R are set within the range of the opaque portion 20, to be exact, the rest positions SP are set at positions that are substantially the lowermost end of the opaque portion 20, and the lower reverse positions LP of the wiper blades 12L and 12R are set so that at least a portion of each of the wiper blades 12L and 12R is positioned above the opaque portion 20.

Furthermore, the wiper device 1 includes a snowfall determination unit (not shown) that determines whether snow is falling outside the vehicle at present. The snowfall determination unit can use an output signal of an outside air temperature sensor, for example. When an outside air temperature sensor is used, determination that snow is falling outside the vehicle can be made when the detection value of the outside air temperature is 0° C. or below. Note that the snowfall determination unit is not limited to the outside air temperature sensor, and a signal of a temperature sensor detecting the temperature of the wiper motor 14 may be used or another snowfall sensor having a different mechanism may be used.

Figure 3:
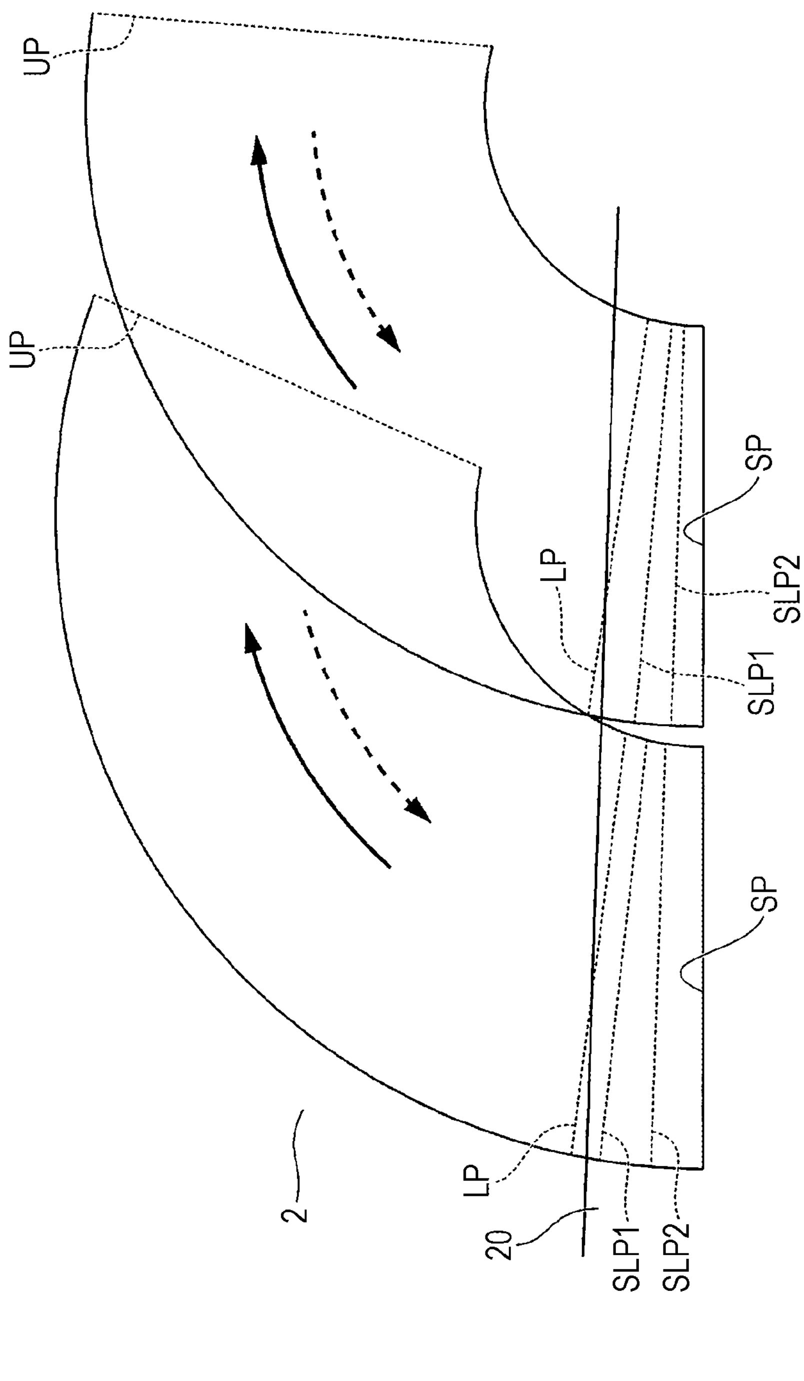
FIG. 3 is a schematic front view of the windshield panel of the vehicle for describing an operation of the wiper device of the exemplary embodiment of the present disclosure.

FIG. 3 is a schematic front view of the windshield panel 2 for describing the operating ranges of the wiper blades 12L and 12R.

In the wiper device 1 according to the present exemplary embodiment, while in a state in which the wiper switch (not shown) is ON, when the snowfall determination unit described above determines that snow is falling outside the vehicle, the controller changes the lower reverse positions of the wiper blades 12L and 12R from the lower reverse positions LP to lower reverse positions SLP1 during snowfall or lower reverse positions SLP2 during snowfall, which are below the lower reverse positions LP.

The lower reverse positions SLP1 during snowfall are each set at a height that is within the range of the opaque portion 20 of the windshield panel 2, and the lower reverse positions SLP2 during snowfall are each set at a height that is within the range of the opaque portion 20 and that is below the corresponding lower reverse position SLP1 during snowfall and above the corresponding rest position SP. The controller selects the lower reverse positions SLP1 during snowfall or the lower reverse positions SLP2 during snowfall in accordance with the operation speed (moving speed) of the wiper blades 12L and 12R. Specifically, when the wiper switch is in a high speed wiping mode ("High"), the lower reverse positions SLP1 during snowfall on the upper side is selected, and when the wiper switch is in a low speed wiping mode ("Low"), an intermittent operation mode ("INT"), a single wipe mode ("MIST"), or a washing mode ("WASH"), the lower reverse positions SLP2 during snowfall on the lower side is selected. Note that when the wiper switch is in the intermittent operation mode, the single wipe mode, or the washing mode, the operation speed of the wiper blades 12L and 12R are lower compared to the operation speed when the wiper switch is in the high speed wiping mode.

Figure 4A:
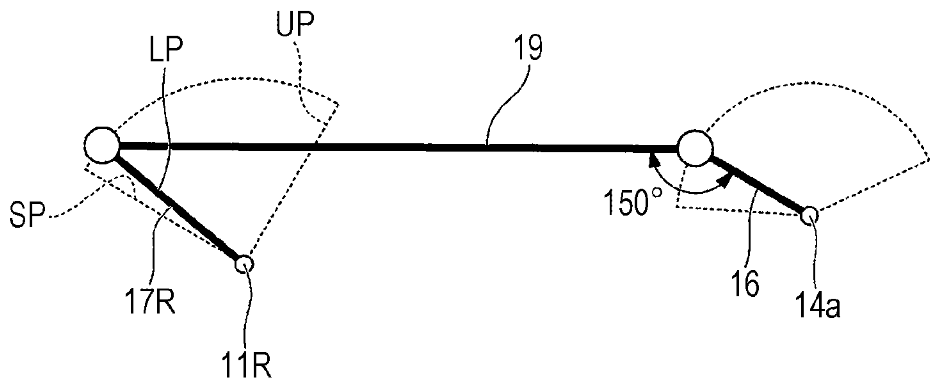
FIGS. 4A to 4C are each a schematic front view of the wiper drive unit for describing an operation of the wiper device of the exemplary embodiment of the present disclosure.
Figure 4B:
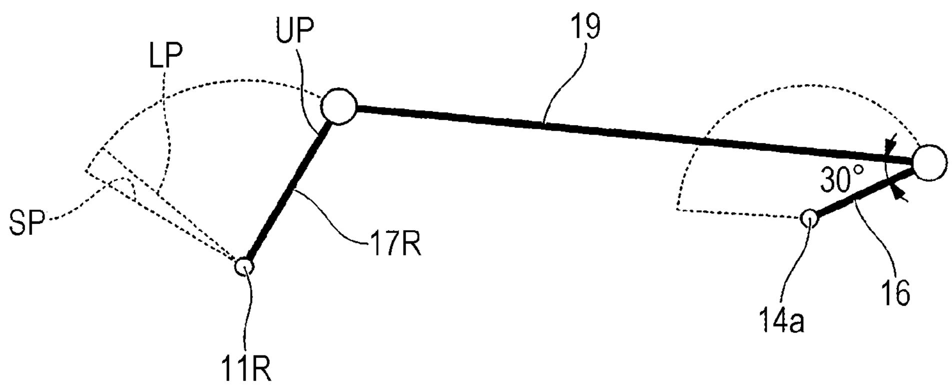
Figure 4C:
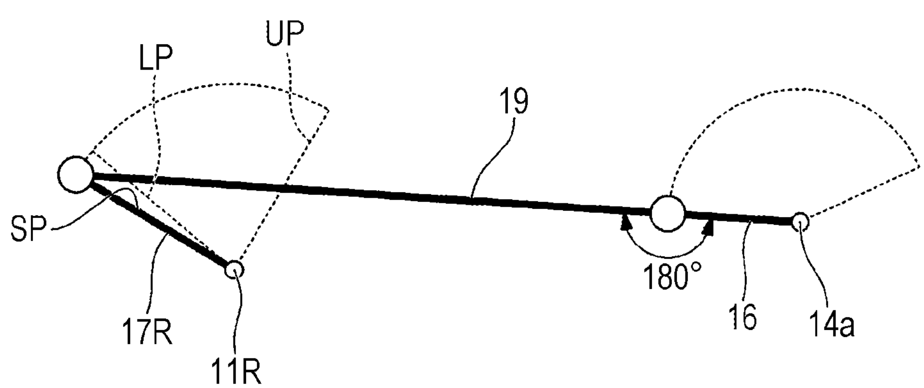

Among FIGS. 4A to 4C, FIG. 4A illustrates pivotal states of the output lever 16 and the connecting link 19 when the wiper blade 12R is at the lower reverse position LP that is the reference position, FIG. 4B illustrates pivotal states of the output lever 16 and the connecting link 19 when the wiper blade 12R is at the upper reverse position UP, and FIG. 4C illustrates pivotal states of the output lever 16 and the connecting link 19 when the wiper blade 12R is at the rest position SP. Note that the angles illustrated in the drawings indicate the pivotal angle of the wiper motor 14 assuming that the pivotal angle of the wiper motor 14 when the connecting link 19 and the output lever 16 completely overlap each other so as to be arranged in a straight line is 0° and the pivotal angle of the wiper motor 14 when the connecting link 19 and the output lever 16 do not overlap each other while being arranged in a straight line is 180°.

In the example in FIGS. 4A to 4C, when the pivotal angle of the wiper motor 14 is 150°, the wiper blade 12R is positioned at the lower reverse position LP that is the reference position, when the pivotal angle of the wiper motor 14 is 30°, the wiper blade 12R is positioned at the upper reverse position UP, and when the pivotal angle of the wiper motor 14 is 180°, the wiper blade 12R is positioned at the rest position SP.

Figure 5:
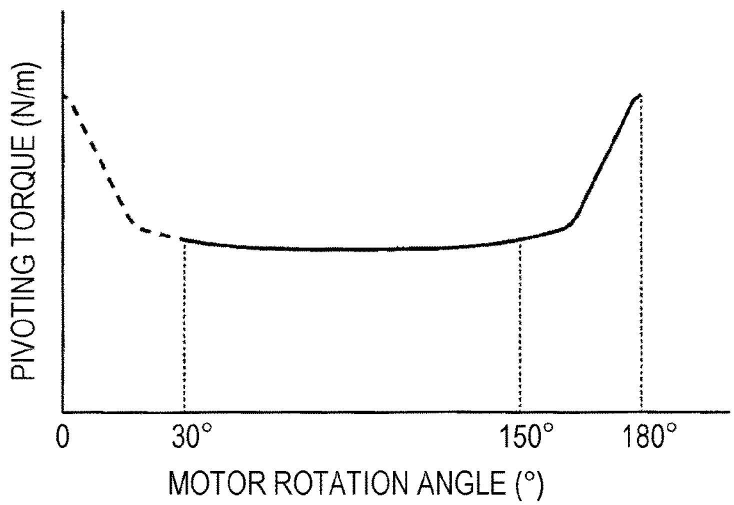
FIG. 5 is a characteristic diagram illustrating a relationship between a rotation angle of a wiper motor of the wiper device of the exemplary embodiment of the disclosure and a torque acting on a pivot shaft.

Furthermore, FIG. 5 is a characteristic diagram illustrating the relationship between the rotation angle (the pivotal angle) of the wiper motor 14 when the wiper motor 14 is pivoted at a uniform speed and the torque acting on the pivot shaft 11R.

In the wiper drive unit 13 according to the present exemplary embodiment, since the output lever 16 and the connecting link 19 is configured so as to be arranged in a straight line when the wiper blade 12R is at the rest position SP, when the pivotal angle of the wiper motor 14 exceeds 150° and approaches 180°, the torque acting on the pivot shaft 11R drastically increases. Accordingly, at the lower reverse position SLP1 during snowfall and the lower reverse position SLP2 during snowfall that are set at positions in which the pivotal angle of the wiper motor 14 is in the range of 150° to 180°, a torque that is larger than the torque at the lower reverse position LP, which is the reference position, acts on the pivot shaft 11R.

Figure 6:
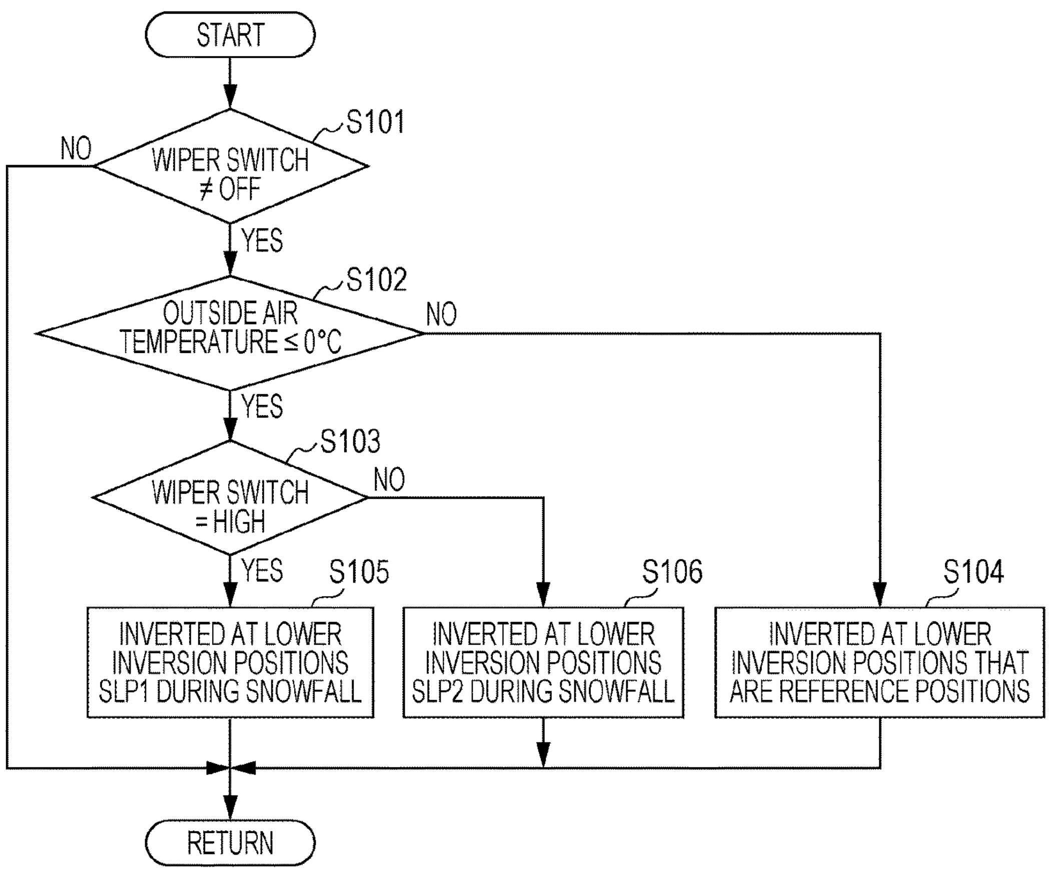
FIG. 6 is a flowchart illustrating an example of an operation of the wiper device of the exemplary embodiment of the present disclosure.

An operation of the wiper device 1 according to the present exemplary embodiment will be described next with reference to the flowchart in FIG. 6.

In step S101, determination is made on whether the wiper switch is OFF, and when the wiper switch is OFF, the process returns to the start, and when the wiper switch is ON, the process proceeds to step S102.

In step S102, the snowfall determination unit determines whether, for example, the detection temperature of the outside air temperature sensor is 0° or below, that is, the snowfall determination unit determines whether a predetermined snowfall condition is satisfied. When the snowfall condition is satisfied, the process proceeds to step S103, and when the snowfall condition is not satisfied, the process proceeds to step S104. In a case in which the process proceeds to step S104, since the wiper operation is an operation that is operated at times other than during snowfall, the lower reverse positions of the wiper blades 12L and 12R are maintained at the lower reverse positions LP, which are reference positions.

In step S103, determination is made on whether the wiper switch is operated in the high speed wiping mode ("High"). When the wiper switch is operated in the high speed wiping mode ("High"), the process proceeds to step S105, and when the wiper switch is operated in a mode other than the high speed wiping mode ("High"), that is, in the low speed wiping mode ("Low"), the intermittent operation mode ("INT"), the single wipe mode ("MIST"), or the washing mode ("WASH"), the process proceeds to step S106.

In a case in which the process proceeds to step S105, since the wiper blades 12L and 12R operate at high speed, the lower reverse positions of the wiper blades 12L and 12R are changed to the lower reverse positions SLP1 during snowfall on the upper side. With the above, the lower reverse positions of the wiper blades 12L and 12R are shifted below the lower reverse positions LP, which are reference positions, and the wiping torque (the torque acting on the pivot shafts 11L and 11R) around the lower reverse positions of the wiper blades 12L and 12R is increased.

On the other hand, in a case in which the process proceeds to step S106, since the wiper blades 12L and 12R operate at low speed, the lower reverse positions of the wiper blades 12L and 12R are changed to the lower reverse positions SLP2 during snowfall on the lower side. With the above, the lower reverse positions of the wiper blades 12L and 12R are shifted below the lower reverse positions LP, which are reference positions, and the lower reverse positions SLP1 during snowfall, and the wiping torque (the torque acting on the pivot shafts 11L and 11R) around the lower reverse positions of the wiper blades 12L and 12R are further increased.

As described above, in the wiper device 1 according to the present exemplary embodiment, when the snowfall determination unit determines that the snowfall condition is satisfied during snowfall, the lower reverse positions of the wiper blades 12L and 12R are changed to the lower reverse positions SLP1 or SLP2 during snowfall from the lower reverse positions LP, which are reference positions. Accordingly, in the case of the wiper device 1 according to the present exemplary embodiment, during normal use other than during snowfall, decrease in wiping efficiency of the wiper blades 12L and 12R caused by the wiper blades 12L and 12R moving to unnecessary areas can be avoided, and during snowfall, the wiping ranges of the wiper blades 12L and 12R becoming narrowed early due to snow that has been pressed and hardened at the lower edge of the windshield panel 2 can be avoided.

In other words, when the wiper device 1 according to the present exemplary embodiment is employed, during snowfall, since the lower reverse positions of the wiper blades 12L and 12R are changed to the lower reverse positions SLP1 or SLP2 during snowfall, snow that has accumulated at the lower edge of the windshield panel 2 can be shoved further downwards at an early stage such that time taken for the field of view of the front side of the windshield panel 2 to be narrowed by snow can be increased further.

Furthermore, in the wiper device 1 according to the present exemplary embodiment, since the lower reverse positions SLP1 and SLP2 during snowfall of the wiper blades 12L and 12R are configured above the rest positions SP, even if the wiper blades 12L and 12R overrun the lower reverse positions SLP1 and SLP2 during snowfall, the wiper blades 12L and 12R can be prevented, beforehand, from interfering with the other members of the storage unit.

In particular, in the case of the present exemplary embodiment, when the wiper blades 12L and 12R are operated in the high speed wiping mode, the lower reverse position during snowfall is set at the lower reverse positions SLP1 during snowfall on the upper side, and when the wiper blades 12L and 12R are operated in a slow speed wiping mode other than the high speed wiping mode, the lower reverse position during snowfall is set at the lower reverse positions SLP2 during snowfall on the lower side. Accordingly, during the high speed wiping mode, in which the overrunning of the wiper blades 12L and 12R has a high possibility of becoming large, the wiper blades 12L and 12R can be prevented, in a more reliable manner, from interfering with the other members of the storage unit.

Furthermore, in the wiper device 1 according to the present exemplary embodiment, since the lower reverse positions SLP1 and SLP2 during snowfall are positioned within the range of the opaque portion 20 at the lower edge of the windshield panel 2, the area of the opaque portion 20 that is a dead space can be used effectively as an extended margin of the lower reverse positions of the wiper blades 12L and 12R during snowfall.

Furthermore, in the wiper device 1 according to the present exemplary embodiment in particular, the output lever 16 that is joined to the output shaft 14*a* of the wiper motor 14 and the distal end of the shaft operation lever 17R that is joined to the pivot shaft 11R are connected to each other in a pivotal manner through the connecting link 19 and when the wiper blades 12L and 12R are in the rest positions, the output lever 16 and the connecting link 19 are configured so as to be arranged in a straight line. Accordingly, immediately before when the wiper blades 12L and 12R are rested in the rest positions, the torque of the wiper motor 14 is amplified to its maximum with the link mechanism including the output lever 16 and the connecting link 19.

Accordingly, in the wiper device 1 according to the present exemplary embodiment, even when the wiper blades 12L and 12R are positioned at the lower reverse positions SLP1 and SLP2 during snowfall that are near the rest positions, the amplification effect on the torque of the wiper motor 14 can be obtained such that snow can be powerfully shoved away at the lower reverse positions SLP1 and SLP2 during snowfall.

Note that the disclosure is not limited to the exemplary embodiment described above and various design changes may be made without departing from the scope of the disclosure.

What is claimed is:

1. A vehicular wiper device, comprising:

a wiper blade that wipes a windshield panel of a vehicle;

a wiper motor configured to move and reciprocate the wiper blade on a surface of the windshield panel, the wiper motor being capable of normal and reverse rotation, thereby reversing the movement of the wiper blade at each of a first lower reverse position and a second lower reverse position to reciprocate the wiper blade;

a controller configured to control the wiper motor to reciprocate the wiper blade between the first lower reverse position and an upper reverse position and move the wiper blade to a rest position that is lower than the first lower reverse position when the wiper blade is not reciprocated; and a snowfall detector that detects a snowfall if a predetermined snowfall condition is satisfied, wherein the controller is configured to change the first lower reverse position to the second lower reverse position that is lower than the first lower reverse position for the reciprocation of the wiper blade if the snowfall detector detects the snowfall.

2. The vehicular wiper device according to claim 1, wherein the second lower reverse position is set above the rest position.

3. The vehicular wiper device according to claim 2, wherein the controller is configured to adjust the second lower reverse position depending upon a moving speed of the wiper blade such that as the moving speed becomes higher, the lower reverse position becomes closer to the first lower reverse position.

4. The vehicular wiper device according to claim 1, wherein the windshield panel has an opaque area at a lower edge thereof, and the second lower reverse position is positioned within the opaque area.

5. The vehicular wiper device according to claim 1, wherein the wiper motor drives the wiper blade via a link mechanism which comprises, a wiper arm that supports the wiper blade;

a pivot axis to which the wiper arm is pivotally joined;

a first arm pivotally joined to the pivot axis such that the wiper arm and the first arm rotate together about the pivot axis;

a second arm operatively joined to an output axis of the wiper motor; and a third arm that connects the first arm and the second arm in a pivotal manner that links their motions, thereby driving the wiper arm via the first to third arms, wherein when the wiper blade is in the rest position, the second arm and the third arm are aligned substantially in one direction.

6. The vehicular wiper device according to claim 1, wherein the controller controls the wiper motor to reciprocate at least two wiper blades via a link mechanism which comprises, wiper arms supporting the respective wiper blades;

pivot axes to which the respective wiper arms are pivotally joined;

first arms pivotally joined to the respective pivot axes such that each wiper arm and each first arm rotate together about each pivot axis;

a second arm operatively joined to an output axis of the wiper motor; and an interlocking link that connects the first arms such that the first arms rotate in a synchronized manner, a third arm that connects one of the first arms and the second arm in a pivotal manner that links their motions, thereby driving the wiper arms via the first to third arms in the synchronized manner.

7. The vehicular wiper device according to claim 6, further comprising a unit frame fixed to a vehicle body and supporting each of the pivot axes such that the pivot axes are positioned at respective predetermined positions on the vehicle body.

8. The vehicular wiper device according to claim 1, wherein the upper reverse position is not changed regardless of the detection of the snowfall.

9. The vehicular wiper device according to claim 1, wherein the first lower reverse position is changed to the second lower reverse position such that a range of the wiper blade movement set when the snowfall is detected becomes larger than the range set when the snowfall is not detected.

* * * * *